Welt fillet or strip face coated with a water resistant composition.

Welt strip grooved at the flesh face through the water resistant coating.

Welt strip grooved and beveled through the water resistant coating.

Patented Aug. 16, 1932

1,872,220

UNITED STATES PATENT OFFICE

PERLEY E. BARBOUR, OF QUINCY, MASSACHUSETTS

WELTING AND METHOD OF ITS MANUFACTURE

Application filed October 1, 1930. Serial No. 485,667.

My invention herein disclosed relates to the manufacture of leather shoe welting of the kind having a stitch-receiving groove, an example of which is Goodyear welting. The object of my invention is to so process the leather, through the step of tempering, that after the inseam sewing operation and throughout the succeeding operations such as welt beating there will be no change in the original width of the welting, thus obtaining and preserving on the shoe the uniform extension necessary for superior workmanship.

To the accomplishment of this object I specially prepare the fillet or welt strip, hereinafter called the "blank", in a manner that will prevent a variation in the width of the welting when tension is applied thereto after tempering, and my invention includes the blank and the welting as thus prepared for tempering as well as the process of manufacture of these novel articles as described in this specification.

Figure 1:
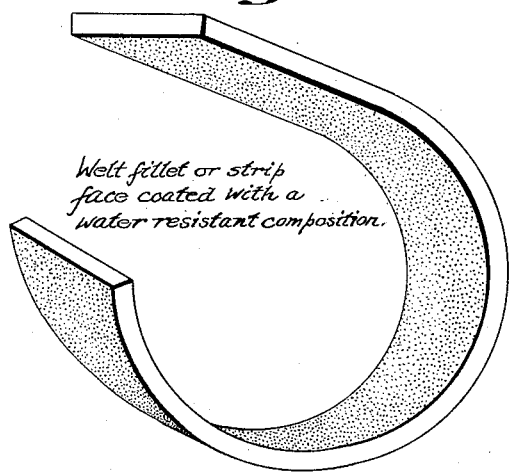
Figure 2:
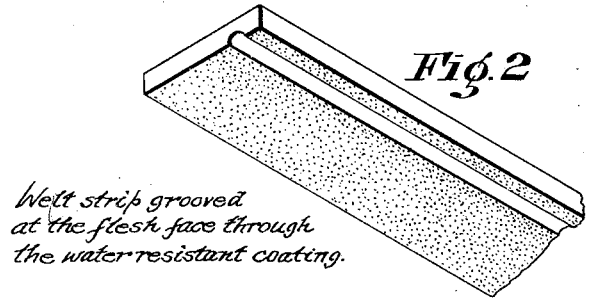
Figure 3:
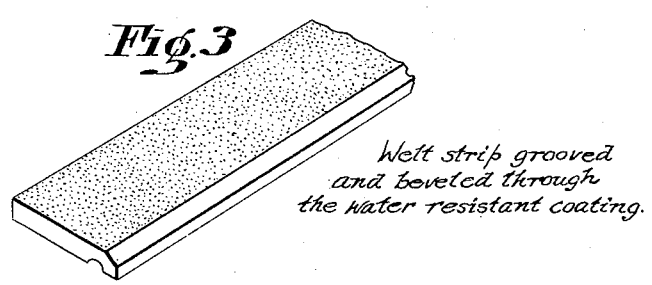

Assistance in understanding the nature and purpose of my invention may be had from an inspection of the accompanying drawing in which Figure 1 shows, in perspective, a piece of an endless welt blank having both sides coated with a water-resistant composition, and Figs. 2 and 3 show, in perspective, respectively the flesh side after grooving and the grain side after beveling, of the coated blank illustrated by Fig. 1.

Since the firmness of welting stock varies to a considerable extent, some leather being of a mellow characteristic which tends to absorb an excess amount of water in the tempering operation, a hank of tempered welting may have portions that can and do stretch under the tension at the inseaming operation. The welt extension, i. e. the width of the exposed grain, will be less than the normal width throughout the areas of the stretched and consequently narrowed welting. This variation in the width of the extension is sometimes so marked that subsequent operations, for example edge trimming, are performed with difficulty resulting in inferior workmanship and often in "cripples" that must be discarded. By virtue of my novel method of preparing the welting and by the use of my novel welting at the tempering operation, as will now be explained, the inseaming operation can be performed without danger of narrowing the welt extension.

An endless blank having been prepared by scarfing and joining ends as usual and this blank having been split, skived, stained on its grain side, dressed and processed as may be desired, it is ready for my new treatment which will preserve the normal welt extension when sewed into a shoe regardless of the characteristics of the stock from which the blank has been made. The blank, at the state of its manufacture just described, is coated, preferably on both sides, with a composition that is water resistant. I have no thought or desire to produce a waterproof leather, that is leather having its fibres thoroughly impregnated with a waterproofing material. My aim and desire is merely to apply a surface layer or coat to the blank which will prevent absorption of water therethrough at the tempering operation. Also the composition used must not be harmful to or obscure the dressed face of the leather. Accordingly I recommend any of the known lacquers or veneers having a base of celluloid or its equivalent and this is applied in any convenient way as by a roll, brush or spray. The lacquer being applied as a coating, its penetration beneath the surface is slight and is less than the depth of the stitch-receiving groove and the bevel the cutting of which constitutes the next step of my process. Because of this slight depth of penetration the groove and bevel cuttings expose unlacquered stock although the remaining areas at both sides of the now completed welting are non-hygroscopic.

The advantage gained by preparing the welting in this way becomes apparent when the welting is tempered as by dipping in water and then mulling. It will be understood that when my welting, surface treated as above described, is immersed in water the water can penetrate into the leather only through the groove and both edges including the bevel at the inner edge. Very little water will penetrate at the outer edge due to the effect of the surfacing lacquer but there is adequate tempering throughout the area that tempering is necessary to make a snug, tight inseam, i. e. along the groove and the bevel or substantially throughout the inner margin of the welting which is to be pierced by the awl and needle of the inseam sewing machine to receive the stitches thereof. In fact I find that more perfect tempering is attained on welting manufactured by my process than has ever been attained before to my knowledge.

Two other main advantages are gained in addition to perfection of temper. First, whatever characteristics the leather may have it will not absorb an excess amount of water to permit undue stretching while being stitched. This control of the tempering results in a complete and even extension about the shoe. Second, the lacquer on the stained face of the welting prevents the stain from being softened by the tempering bath and so being transferred to the thread as it is pulled through. This protection to the thread insures clean stitches which have been a detriment in many shoes made with the present stained but unlacquered welting.

While I have described the novel welting as having been coated on both sides this is not always essential. Some manufacturers temper by moistening or wetting only the flesh side of the welting and under this practice obviously a non-hygroscopic coating merely on the flesh of the blank will be sufficient if the grain side is kept dry and there is no danger of the stain coloring the thread. Otherwise both sides should be coated to gain the full advantage attainable from my invention. It will be understood that the entire surface of the blank, including its edges, may be coated without detriment to the succeeding tempering, if this method of applying the lacquer is more convenient.

In the following claims the term "unfitted" defines a welt fillet or strip that is ungrooved and/or unbeveled. Goodyear welting for men's work is usually grooved and beveled while for women's work it may be merely grooved due to its lighter weight.

The nature and scope of my invention having been indicated and the characteristic feature of the welting and its process of manufacture having been specifically described, what I claim as new, is:—

1. Grain leather welting having a stitch-receiving groove in its flesh side and said side except within the groove being surface coated with a water-resistant composition.

2. Grooved and beveled grain leather Goodyear welting having a water-resistant surface coating on the plane surface at both sides, the penetration of the coating into the stock being less than the depth of the grooving and beveling cuts whereby the groove and bevel expose the untreated stock.

3. Grain leather Goodyear welting having both sides coated with a substantially transparent lacquer or veneer of non-hygroscopic property, and a groove and a bevel extending through said coating to expose the underlying untreated stock.

4. Grain leather welting having its grain stained and its flesh grooved, provided with a water-resistant surface coating throughout the grain and at both sides of but not within the groove.

5. The method of making grain leather welt fillets or strips which comprises preparing a blank, staining the grain side of the blank, and then applying a slightly penetrable surface layer of water-resistant composition to both the grain and the flesh sides.

6. The method of making grain leather welting which comprises preparing an endless blank, surface coating the flesh side thereof at least with a water-resistant composition, and then cutting a groove in the flesh side completely through said coating to expose the underlying untreated stock.

7. The method of making grain leather welting which comprises preparing an endless blank, staining the grain, covering both sides with a surface layer of water-resistant composition, and then removing portions of said layer and exposing the underlying untreated stock by grooving and beveling the blank.

8. The method of making leather welting which comprises treating a surface of an unfitted blank with a non-hygroscopic coating which penetrates but slightly beneath said surface, and then fitting said blank by cutting through the depth of said coating and into the untreated stock throughout a defined area of said surface.

PERLEY E. BARBOUR.